(12) United States Patent
Schreder et al.

(10) Patent No.: US 11,964,909 B2
(45) Date of Patent: Apr. 23, 2024

(54) SEALING GLASS AND USE THEREOF

(71) Applicant: SCHOTT AG, Mainz (DE)

(72) Inventors: Bianca Schreder, Sulzbach (DE); Ute Wölfel, Mainz-Laubenheim (DE); Stefanie Hansen, Gensingen (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 17/218,592

(22) Filed: Mar. 31, 2021

(65) Prior Publication Data
US 2021/0300814 A1  Sep. 30, 2021

(30) Foreign Application Priority Data

Mar. 31, 2020 (DE) ..................... 10 2020 108 867.1

(51) Int. Cl.
C03C 8/24 (2006.01)
C03C 3/118 (2006.01)
C03C 8/06 (2006.01)

(52) U.S. Cl.
CPC ................ *C03C 8/06* (2013.01); *C03C 3/118* (2013.01)

(58) Field of Classification Search
CPC ........................................................ C03C 8/24
See application file for complete search history.

(56) References Cited

U.S. PATENT DOCUMENTS

| 6,110,596 | A | 8/2000 | Kasori | |
|---|---|---|---|---|
| 7,315,125 | B2* | 1/2008 | Kass | C03C 3/089 |
| | | | | 313/636 |
| 9,512,030 | B2* | 12/2016 | Mauro | C03C 3/091 |
| 10,570,052 | B2* | 2/2020 | Kass | A61J 1/06 |
| 2002/0001881 | A1 | 1/2002 | Kosokabe | |
| 2003/0050173 | A1 | 3/2003 | Lin | |
| 2003/0094013 | A1 | 5/2003 | Sato | |
| 2003/0161048 | A1 | 8/2003 | Tsuda | |
| 2006/0036009 | A1 | 2/2006 | Stevens | |
| 2006/0063009 | A1 | 3/2006 | Naitou | |

(Continued)

FOREIGN PATENT DOCUMENTS

| CN | 101428966 | 5/2009 |
|---|---|---|
| DE | 102010035251 | 9/2011 |

(Continued)

OTHER PUBLICATIONS

Glass: Determination of Coefficient of Mean Linear Thermal Expansion (ISO 7991, Dec. 14, 1987).

(Continued)

*Primary Examiner* — Karl E Group
(74) *Attorney, Agent, or Firm* — Ruggiero McAllister & McMahon LLC

(57) ABSTRACT

A sealing glass is provided that includes $SiO_2$, $Al_2O_3$ having a content of less than 2% by weight, is free of PbO except for unavoidable impurities, a coefficient of linear thermal expansion ($\alpha_{20-300}$) of more than $10*10^{-6}$/K, a dielectric constant ($\varepsilon_r$) in the range from at least 7.10 to not more than 7.80 at a measurement frequency of 1 MHz and a temperature of 25° C., and a glass transition temperature ($T_g$) in a range from 400 to 550° C.

19 Claims, 2 Drawing Sheets

(56) References Cited

U.S. PATENT DOCUMENTS

| | | | |
|---|---|---|---|
| 2011/0165380 A1 | 7/2011 | Gahagan | |
| 2015/0037552 A1* | 2/2015 | Mauro | C03C 3/091 501/65 |
| 2016/0036016 A1* | 2/2016 | Dahlmann | H01M 10/0525 429/179 |
| 2019/0023605 A1* | 1/2019 | Hirose | C03C 8/02 |

FOREIGN PATENT DOCUMENTS

| | | | | |
|---|---|---|---|---|
| DE | 102013006463 | | 1/2017 | |
| JP | 2002167234 | | 6/2002 | |
| JP | 2004035406 | | 2/2004 | |
| JP | 2007246311 A | * | 9/2007 | C03C 3/062 |
| JP | 2008189546 | | 8/2008 | |
| JP | 2010083723 | | 4/2010 | |
| JP | 2011068507 | | 4/2011 | |
| JP | 2014234341 | | 12/2014 | |
| JP | 2016074575 | | 5/2016 | |
| JP | 2017193464 | | 10/2017 | |
| WO | 2013018586 | | 2/2013 | |
| WO | 2014005406 | | 1/2014 | |

OTHER PUBLICATIONS

Glass—Viscosity and viscometric fixed points, Part 8: Determination of (dilatometric) transformation temperature (ISO 7884-8 : 1987).

* cited by examiner

SEALING GLASS AND USE THEREOF

CROSS REFERENCE TO RELATED APPLICATIONS

This application claims benefit under 35 USC § 119 of German Application 10 2020 108 867.1 filed Mar. 31, 2020, the entire contents of which are incorporated herein by reference.

BACKGROUND

1. Field of the Invention

The present disclosure relates generally to a vitreous material, in particular a sealing glass, and also the use thereof.

2. Description of Related Art

Sealing glasses are quite generally glasses or vitreous materials having a low softening point which are used, in particular, to produce seals, for example an impermeable connection between two join partners. In particular, sealing glasses can be present in the form of glass bodies, with two or more glass bodies composed of such a sealing glass being fused to one another. Here, for example, wires or feedthroughs, i.e., metallic materials in general, and also alternatively and/or additionally ceramic materials can be present between the starting glass bodies or at least in contact with the starting glasses, which are then after thermal treatment enclosed by the sealing glass and are in this way protected from environmental and other influences. However, it is also possible for the sealing glass to be present in the form of glass powder by means of which connections can be produced in a process similar to soldering using, for example, tin. The connections produced by means of such sealing glasses are generally mechanically very stable and highly impermeable to passage of, for example, fluids. In particular, such connections can be made hermetically tight or vacuum-tight. Due to these advantageous properties of sealing glasses, they can also be used in very demanding applications, for example in the field of sensors such as pressure sensors. In the field of sensors in particular, for example pressure sensors, particularly important factors can be not only the sealing behavior, i.e., for example, a low softening point, but also the dielectric properties of the glass, e.g., the dielectric constant, and the thermal and/or temporal stability thereof and quite generally the stability of the glass to environmental influences, in particular to moisture and/or temperature fluctuations.

Sealing glasses having a particularly low softening point in the range from 350° C. to 700° C. are frequently lead-containing since lead oxide is a component which reduces the softening point and nevertheless ensures stability of the glass to environmental influences. In particular, a lead content of a sealing or solder glass can also ensure a stability of the dielectric properties which is sufficient for sensor applications combined with a sufficiently low softening point. However, lead is a known hazardous material, so that replacement of lead-containing sealing glasses and glass solders is desirable from health, regulatory and environmental points of view.

A low softening point of a glass can be achieved with replacement of lead as glass component by, for example, high contents of alkali metal oxides. However, alkali metal oxides are problematical in respect of the stability of the materials properties of glass under fluctuating environmental conditions, as can occur under use conditions, for example in the case of sensors such as pressure sensors, in particular in respect of the dielectric properties. The content of alkali metal oxides is therefore limited, so that a sufficiently low softening point cannot be set by increasing the alkali metal content.

The Japanese patent application JP 2016/074575 A describes an optical glass having a low coefficient of linear thermal expansion, which is obtainable as precision casting. Sealing glasses having a high coefficient of thermal expansion of, for example, more than $10*10^{-6}$/K are not described.

The Japanese patent application JP 2002/167234 A describes a sealing glass by means of which it is possible to produce a vacuum-tight connection of a metal vessel, for example a thermos flask. The glass is lead-free and has a content of boron oxide of up to 37 mol % at a content of $SiO_2$ of not more than 45 mol %. Such a glass generally has only a very low chemical resistance. In particular, the stability of a glass having such a composition will tend to be low.

The US patent application US 2002/0001881 A1 describes a lead-free glass and also a glass tube for encapsulation of semiconductor materials having a coefficient of thermal expansion of up to $10.5*10^{-6}$/K, with the temperature at which the glass has a viscosity of $10^6$ dPas being not more than 710° C. In order to ensure a sufficient chemical stability of the glass, the illustrative glasses of US 2002/0001881 A1 have a minimum content of 2.5% by weight of $Al_2O_3$. The glass is, after melting, shaped to form a tube and can be sealed at the ends of the tube by action of heat. A sealing glass or solder glass for sensor applications is not described.

The US patent application US 2003/0050173 A1 describes a siliceous composition for an optical glass which can be used as substrate for optical thin film interference filters. A sealing glass is not described.

The US patent application US 2003/0094013 A1 relates to a pressable glass which displays only low adhesion in a mold. A sealing or solder glass is not described.

The US patent application US 2003/0161048 A1 relates to a planar lens having a flat glass substrate into which a component which increases the refractive index diffuses. A sealing or solder glass is not described.

The Japanese patent application JP 2003/351024 A describes a pressable glass which does not melt onto the surface of the mold in the pressing operation. A sealing or solder glass is not described.

The US patent application US 2006/0063009 A1 describes a high-strength glass for, for example, flat panel displays. The glass comprises at least one rare earth oxide and can be subjected to a prestressing process. However, US 2006/036009 A1 does not describe a composition of a sealing or solder glass.

The Japanese patent application JP 2008/189546 A describes a pressable glass which does not melt onto the surface of the mold in the pressing operation. A sealing or solder glass is not described.

The Japanese patent application JP 2010/083723 A relates to an optical glass, a sample holder and an optical element for improving the image quality during observation, the recording of images and the measurement accuracy during a measuring operation. A sealing glass or a solder glass is not mentioned.

The Japanese patent application JP 2011/068507 A describes the provision of spherical multicomponent glass particles as sintering aid in the production of ceramics. A sealing or solder glass is not described.

The US patent application US 2011/0165380 A1 relates to a covering arrangement for electronic display devices, for example a liquid crystal display. This comprises an aluminosilicate glass which can, for example, be chemically prestressed. A sealing or solder glass is not described.

The International patent application WO 2013/018586 A1 describes an optical glass having a glass transition temperature of less than 600° C. and specific optical constants (for example refractive index and Abbe number), which compared to known glasses having the corresponding optical constants comprises a smaller amount of rare earth elements. The glass can also be used in the production of encapsulations of LEDs or camera lenses. Sensor applications are not mentioned.

The Japanese patent application JP 2014/234341 A relates to a glass element having high strength, which has been produced from a sintered glass powder and has an ion exchange layer on the glass surface. A sealing or solder glass is not described.

The Japanese patent application JP 2017/193464 A relates to an optical glass. A sealing or solder glass is not described.

There is thus a need for lead-free sealing glasses which have low softening points and nevertheless have a temporal and/or thermal stability of the materials properties under use conditions which is sufficient for sensor applications.

SUMMARY

It is an object of the invention to provide glasses which at least partially overcome or alleviate the weaknesses of the prior art.

The present disclosure accordingly provides a sealing glass comprising $SiO_2$ and less than 2% by weight of $Al_2O_3$, wherein the sealing glass has a coefficient of linear thermal expansion $\alpha_{20-300}$ of more than $10*10^{-6}$/K and the sealing glass is free of PbO except for unavoidable traces. The sealing glass preferably has a dielectric constant $\varepsilon_r$ in the range from at least 7.10 to not more than 7.80, preferably determined at a measurement frequency of 1 MHz and a temperature of 25° C., with the glass transition temperature $T_g$ preferably being in the range from 400 to 550° C., preferably from 450° C. to 500° C.

Such a sealing glass has a number of advantages.

The present disclosure also provides for the use of the sealing glass in embodiments as pressed body or shaped body for liquid-tight and gastight insulation of wires and ceramic constituents in metallic housings, e.g., steel variants, where the average CTE is about 10-12 $10^{-6}$/K for all components. These components are constituents of pressure/gas or other sensors which can also be used under relatively tough environmental conditions. Although the fusion temperature of the sealing glass is, in embodiments, higher than that of known lead-containing solder glasses and sealing glasses, the sealing glass has, in embodiments, a surprisingly good crystallization stability which is advantageous precisely for solder glass applications which are not aimed at the formation of ceramic solders.

Furthermore, the sealing glass can, in embodiments of the present disclosure, be used for joining join partners, in particular join partners composed of a metal or comprising a metal and/or composed of a ceramic or comprising a ceramic, in particular for joining at least one join partner composed of a metal or comprising a metal and at least one join partner comprising a ceramic or composed of a ceramic. For the purposes of the present disclosure, a join partner is quite generally a component which is to be connected or joined to a further component.

In the present case, the sealing glass comprises $SiO_2$, i.e., is a siliceous glass. This is advantageous because, firstly, $SiO_2$ is a known component of glasses and the industrial production of siliceous glasses is a widely implemented process.

The sealing glass according to the present disclosure is free of PbO except for unavoidable traces. This is advantageous from regulatory but in particular also health and environmental points of view since lead and lead-containing compounds and substances are harmful to many life forms.

The coefficient of linear thermal expansion, $\alpha_{20-300}$, of the sealing glass of the present disclosure, i.e., determined for the temperature range from 20° C. to 300° C., is at least $8.0*10^{-6}$/K, preferably at least $9.0*10^{-6}$/K, more preferably at least $10.0*10^{-6}$/K, with the upper limit for the coefficient of linear thermal expansion preferably being not more than $17*10^{-6}$/K. In particular, the upper limit to the coefficient of thermal expansion can be not more than $14*10^{-6}$/K, preferably not more than $12*10^{-6}$/K. In particular, the coefficient of linear thermal expansion can be in the range from at least $9*10^{-6}$/K to not more than $14*10^{-6}$/K, for example from at least $10*10^{-6}$/K to $14*10^{-6}$/K. This is advantageous since an impermeable connection to a join partner, for example consisting of a metal or comprising a metallic material, for example an alloy of one or more metals or a metal-ceramic composite, can be achieved in this way. This is important because metals or metallic materials generally have a quite high coefficient of linear thermal expansion compared to siliceous glasses. When the coefficients of linear thermal expansion of the sealing glass and of the material or materials to be joined and/or sealed differ too greatly, crack formation in the glass component and/or at least partial detachment of the glass component from the join partner can occur during use of a sealed and/or joined component. This can be avoided when the coefficients of linear thermal expansion of the sealing glass and of the material to be joined and/or sealed are as close as possible. However, it is for this reason also advantageous for the coefficient of linear thermal expansion not to be too great since, in particular, it is possible in this way for an impermeable, preferably even hermetically sealed or vacuum-tight, connection between a metallic material and a ceramic material to be able to be produced or for the sealing glass also to be able to be used for joining ceramic materials to one another. Appropriate selection of the precise composition of the sealing glass within the composition ranges mentioned in the context of the present disclosure makes it possible to match the coefficient of thermal expansion of the sealing glass optimally to the coefficient of thermal expansion of the join partners to be joined. Here, it should be noted that many metals have a coefficient of thermal expansion of $20*10^{-6}$/K or more, while the coefficient of thermal expansion of ceramics is often less than $10*10^{-6}$/K, typically at or about $7*10^{-6}$/K. The sealing glass which is used for joining a metal and a ceramic should therefore have a coefficient of thermal expansion which suits both coefficients of thermal expansion, in particular when the glass is fused into a metallic housing. Such a metallic housing will generally shrink greatly on cooling after the sealing operation. For this reason, the sealing glass likewise has to shrink greatly in order for no cracks to be formed, but must also not shrink to such an extent that the ceramic surrounded by the sealing glass would be damaged. Furthermore, it is necessary for the sealing glass to wet both the metal surface and the ceramic surface well during the sealing or fusion operation in order for no air gap to be formed.

The sealing glass comprises less than 2% by weight of $Al_2O_3$. $Al_2O_3$ is a known network former which is added to, in particular, alkali metal-containing silicate glasses. This is because the addition of $Al_2O_3$ reduces the number of separating point oxygens, which can be advantageous for particular applications of industrial glasses. However, an excessively high $Al_2O_3$ content decreases the chemical resistance of the resulting glass, in particular the acid resistance. For this reason, the content of $Al_2O_3$ in the sealing glass is advantageously limited to the present disclosure and is not more than 2% by weight, preferably not more than 1% by weight. In a particularly preferred embodiment, the sealing glass is free of $Al_2O_3$ except for unavoidable traces. Unavoidable traces of $Al_2O_3$ are production-related impurities and are not more than 3000 ppm by weight. A particularly good stability of the properties of the sealing glass under use conditions can advantageously be achieved in this way. These unavoidable traces can preferably be even lower, for example not more than 500 ppm by weight.

The sealing glass preferably has a dielectric constant Er in the range from at least 7.10 to not more than 7.80. This is advantageous especially for particular sensor applications, in particular for pressure sensors.

Especially in the case of particular pressure sensors, it can be also advantageous for the dielectric constant of a vitreous material encompassed by the sensor, for example a sealing glass, to have a good temperature-time stability. The stability of the dielectric constant can here be determined by comparing the capacitance of a capacitor comprising the glass in question as dielectric in the initial state ($C_0$) and after particular stressing (C), for example by means of the ratio of these capacitances:

$$\frac{c}{c_0}.$$

Good stability of the dielectric constant is obtained when this ratio assumes values of less than 2, preferably less than 1.5, particularly preferably less than 1.2, preferably determined for temperature-time stressing at 85° C. for 40 hours and/or for 600 hours.

In one embodiment, the sealing glass thus has a stability of the dielectric constant, determined by the ratio of $$\frac{c}{c_0}.$$

where $C_0$ is the capacitance in the initial state, C is the capacitance after thermal stressing, where the ratio is less than 2, preferably less than 1.5, particularly preferably less than 1.2, preferably determined for temperature-time stressing at 85° C. for 40 hours and/or for 600 hours.

For the purposes of the present disclosure, the following definitions of terms apply:

Unavoidable traces of element oxides in the sealing glass are production-related impurities, for example due to the purity of the starting materials used. In the case of abundant elements, for example aluminum, a higher level of contamination will therefore frequently occur than in the case of a rather rare element, for example lead. Unavoidable traces of PbO in the sealing glass are contents of less than 500 ppm by weight.

The transformation temperature (or glass transition temperature) $T_g$ is determined by the intersection of the tangents with the two branches of the expansion curve in a measurement carried out using a heating rate of 5 K/min. This corresponds to a measurement in accordance with ISO 7884-8 or DIN 52324.

For the purposes of the present disclosure, the terms network transformer and network former are understood and used in the sense of the network hypothesis of Zachariasen.

The coefficient of linear thermal expansion α or coefficient of thermal expansion for short (also CTE) is, unless otherwise indicated, reported for the range 20-300° C. in the present disclosure. The designations α and $\alpha_{20\text{-}300}$ are used synonymously in the present disclosure. The value indicated is the nominal average coefficient of thermal longitudinal expansion in accordance with ISO 7991, which is determined in a static measurement.

The coefficient of thermal expansion (CTE) describes, for the purposes of the present invention, the change in the dimension of a material in the case of temperature changes and is based on the material-specific effect of thermal expansion. Specifically, reference is made to the coefficient of thermal longitudinal expansion a which is defined according to the following formula (I):

$$\alpha L = \frac{dL}{dT}(I)$$

In embodiments in which the join partner comprises more than one material, the expression "coefficient of thermal expansion" relates to the average coefficient of thermal expansion of the total join partner.

If the join partner is, for example, a ceramic-metal composite consisting of at least one layer of ceramic K2 and at least one layer of metal M2, the average coefficient of thermal expansion $\bar{\alpha}$ is calculated as follows:

$$\bar{\alpha} = \frac{\alpha_{K2} E_{K2} d_{K2} + \alpha_{M2} E_{M2} d_{M2}}{E_{K2} d_{k2} + E_{M2} d_{M2}}$$

where the symbols have the following meanings:
$\alpha_{K2}$ coefficient of thermal expansion of ceramic K2 [1/K];
$\alpha_{M2}$ coefficient of thermal expansion of metal M2 [1/K];
$E_{K2}$ E modulus of ceramic K2 [GPa];
$E_{M2}$ E modulus of metal M2 [GPa];
$d_{K2}$ layer thickness of ceramic K2 [m];
$d_{M2}$ layer thickness of metal M2 [m].

The softening point (SP) is the temperature at which the viscosity of a glass is $10^{7.6}$ dPas.

In one embodiment, the sealing glass comprises at least 45% by weight of $SiO_2$. $SiO_2$ is a known network former in glass. A very high content of $SiO_2$ in the sealing glass advantageously also assists the chemical stability thereof. The content of $SiO_2$ in the sealing glass is therefore preferably at least 50% by weight, more preferably at least 51% by weight. However, a high content of $SiO_2$ in the sealing glass can be unfavorable since an excessively high content of $SiO_2$ can lead to high melting and/or softening points. An excessively high content of $SiO_2$ can also lead to a low coefficient of linear thermal expansion. The content of $SiO_2$ in the sealing glass is therefore advantageously limited. The sealing glass preferably comprises not more than 75% by weight of $SiO_2$, more preferably not more than 65% by weight, particularly preferably not more than 63% by weight and very particularly preferably not more than 62% by weight. The $SiO_2$ content of a sealing glass can, for example, be in the range from at least 45% by weight to not more than 75% by weight, or from at least 50% by weight to not more than 65% by weight or from at least 51% by weight to not more than 62% by weight, or from at least 50% by weight to not more than 63% by weight, for example from at least 51% by weight to not more than 56% by weight, or from at least 50% by weight to not more than 72% by weight, for example from at least 58% by weight to not more than 63% by weight.

In a further embodiment, the sealing glass comprises at least 2% by weight of $B_2O_3$. $B_2O_3$ is also a known component in glasses and is among the network formers. A minimum content of $B_2O_3$ is advantageous since a content of $B_2O_3$ in a glass reduces the melting point. The sealing glass preferably comprises at least 5% by weight of $B_2O_3$, more preferably at least 7% by weight, particularly preferably at least 8% by weight and very particularly preferably at least 13% by weight. However, an excessively high content of $B_2O_3$ can have an adverse effect on, in particular, the chemical stability, especially on the hydrolytic resistance. The content of $B_2O_3$ in the sealing glass is for this reason preferably limited. In one embodiment, the sealing glass comprises not more than 20% by weight of $B_2O_3$, preferably not more than 18% by weight and particularly preferably not more than 17% by weight. Advantageous ranges for the $B_2O_3$ content can be from 5% by weight to 18% by weight, or from 8% by weight to 17% by weight, or from 7% by weight to 11% by weight, or from 13% by weight to 18% by weight.

In a further embodiment, the total content of alkali metal oxides, $R_2O$, in the sealing glass is at least 10% by weight. Alkali metal oxides are network transformers. It is advantageous for the sealing glass to comprise alkali metal oxides since these lower the fusion temperature and lead to an increase in the coefficient of linear thermal expansion. Network transformers lead to an increase in the number of separating point oxygens in the glass network and are therefore also advantageous for achieving a sufficiently high dielectric constant of preferably at least 7.1, preferably determined at a measurement frequency of 1 MHz and a temperature of 25° C., since separating point oxygens are more easily polarizable than bridging oxygens. The total content of alkali metal oxides, $R_2O$, in the sealing glass is therefore preferably at least 17% by weight, preferably at least 13% by weight, more preferably at least 14% by weight, even more preferably at least 15% by weight; very particularly preferably at least 16% by weight and most preferably at least 17% by weight. However, the content of alkali metal oxides in the sealing glasses should, according to the present disclosure, not be too high since these can decrease the chemical resistance. In particular, an excessively high content of alkali metal oxides leads to the dielectric properties of the sealing glass, for example the dielectric constant, not being stable, for example in the presence of increased atmospheric humidity. For this reason, the total content of alkali metal oxides in the sealing glass is, according to one embodiment, limited and is not more than 40% by weight, preferably not more than 35% by weight, more preferably not more than 34% by weight, even more preferably not more than 30% by weight, particularly preferably not more than 26% by weight and very particularly preferably not more than 24% by weight. Advantageous ranges for the total content of alkali metal oxides, $R_2O$, in the sealing glass can be from 15% by weight to 35% by weight, or from at least 13% by weight to not more than 30% by weight, or from at least 14% by weight to not more than 26% by weight, or from at least 16% by weight to not more than 24% by weight, or from at least 17% by weight to not more than 34% by weight.

A particularly critical component is the alkali metal oxide $Na_2O$. The sealing glass can comprise $Na_2O$ as optional component, with the content of $Na_2O$ in the sealing glass being not more than 10% by weight, preferably not more than 5% by weight, more preferably not more than 0.5% by weight, and with the sealing glass particularly preferably being free of $Na_2O$ except for unavoidable traces. $Na_2O$ is a known glass component and is also frequently used in glasses because of its good availability and the favorable price compared to other glass components resulting therefrom. However, $Na_2O$ is unfavorable for the use addressed here since the sodium ion is particularly mobile in the glass network and thus reduces the stability of a glass such as a sealing glass to a particular extent. In particular, the sodium ion is most mobile in the glass network on application of an electric field and/or when the temperature is increased and is therefore unfavorable when, for example, a particularly good stability, for example of the dielectric constant, is to be achieved. In addition, the sodium ion can be leached particularly easily from a vitreous material. In order to achieve a particularly good stability of the properties of the sealing glass, it is therefore advantageous for the content of $Na_2O$ in the sealing glass to be limited. It is preferably not more than 500 ppm by weight. In other words, the sealing glass is, in one embodiment, free of $Na_2O$ except for unavoidable traces.

In a further embodiment, the sealing glass comprises $Li_2O$. According to an embodiment, the sealing glass comprises 0% by weight of $Li_2O$ to preferably at most 10% by weight of $Li_2O$. As alkali metal oxide, $Li_2O$ is a network transformer. A content of $Li_2O$ in the sealing glass is therefore advantageous for achieving a low softening point. $Li_2O$ is a preferred component of the sealing glass in embodiments of the present disclosure since, owing to its very high field strength, it generally binds more strongly in the glass network than, for example, the sodium ion despite its small size. In embodiments, the sealing glass can comprise at least 1% by weight of $Li_2O$, preferably at least 3% by weight. However, the content of $Li_2O$ in the sealing glass should not be too high. Firstly, $Li_2O$ is a relatively expensive component compared to other components. Secondly, it is known that $Li_2O$ as component in glasses can also lead to demixing and/or crystallization of the glass. Furthermore, owing to its high field strength, the lithium ion binds separating point oxygens relatively strongly, which is disadvantageous in respect of the polarizability of the separating point oxygens produced in the glass network by the introduction of $Li_2O$, and lowers the dielectric constant. The sealing glass therefore preferably comprises, in embodiments, not more than 10% by weight of $Li_2O$, preferably not more than 5% by weight. In a further embodiment, the sealing glass comprises not more than 1% by weight of $Li_2O$. It can even be preferred for the sealing glass to be free of $Li_2O$ except for unavoidable traces. Unavoidable traces of $Li_2O$ are contents of not more than 500 ppm of $Li_2O$, based on the weight. Preferred ranges of the $Li_2O$ content in embodiments can be from at least 1% by weight to not more than 10% by weight of $Li_2O$, for example from at least 3% by weight to not more than 5% by weight.

In yet another embodiment, the sealing glass comprises at least 5% by weight of $K_2O$. As an alkali metal oxide, $K_2O$ as component contributes to a lowering of the softening point. For this reason, the content of $K_2O$ should be not less than 5% by weight since otherwise no sufficient lowering of the softening point is possible. The content of $K_2O$ in the sealing glass is preferably at least 8% by weight, more preferably at least 10% by weight, of $K_2O$, even more preferably at least 12% by weight, particularly preferably 14% by weight, very particularly preferably at least 15% by weight of $K_2O$. Furthermore, compared to the lithium ion and the sodium ion, the potassium ion has a relatively low field strength. This is advantageous for achieving a sufficiently high dielectric constant of preferably at least 7.1, preferably determined at a measurement frequency of 1 MHz and a temperature of 25° C., since owing to the rather low field strength potassium ions lead to decreased binding of the separating point oxygen than do lithium and/or sodium ions. However, the content of $K_2O$ should also not be too high since, as alkali metal oxide, $K_2O$ is also a mobile component in the glass network and could at an excessively high content lead to a lowering of the chemical resistance of the sealing glass. For this reason, the content of $K_2O$ in the sealing glass is preferably limited and in one embodiment is not more than 40% by weight of $K_2O$. The content of $K_2O$ in the sealing glass is preferably not more than 35% by weight, particularly preferably not more than 34% by weight, very particularly preferably not more than 20% by weight and most preferably not more than 18% by weight. The potassium ion is larger than the sodium ion and is therefore less mobile in a glass network than the sodium ion. Preferred ranges for the content of $K_2O$ in the sealing glass are from at least 10% by weight to not more than 35% by weight, for example from at least 15% by weight to not more than 35% by weight, in particular from 15% by weight to 20% by weight, or from at least 8% by weight to not more than 34% by weight, in particular from 14% by weight to not more than 34% by weight, or from at least 12% by weight to not more than 20% by weight, for example from at least 15% by weight to not more than 18% by weight.

In order to achieve a satisfactory temperature-time stability of the sealing glass, in particular the physical and chemical properties of the sealing glass, for example the dielectric constant, the content of "mobile" ions in the glass network should be very low. However, such mobile ions are just those which as component in the form of network transformers, thus alkali metal oxides and/or alkaline earth metal oxides, are necessary for lowering the glass transition temperature and thus also the fusion temperature, especially when PbO is to be avoided as glass component. It has been found to be advantageous for not more than two different alkali metal oxides to be added as component, except for unavoidable impurities. In one embodiment, the sealing glass therefore advantageously comprises only two different alkali metal oxides as components, preferably $Li_2O$ and $K_2O$.

This is also advantageous because alkalis in particular are not only disadvantageous for good resistance of the glass but, especially in the case of sealing glasses, it also has to be taken into account that alkalis are very aggressive on contact with ceramics and can at least partially dissolve these. For this reason, the content of alkali metal oxides in the sealing glass is, in one embodiment, restricted in such a way that the total content in the sealing glass is not greater than at most 24% by weight and the sealing glass comprises only two alkali metal oxides as components except for unavoidable contamination with further alkali metal oxides. For the purposes of the present disclosure, the statement that the sealing glass "comprises an oxide as component" or an oxide "is added as component" to the sealing glass means that the corresponding oxide is deliberately added and is not merely encompassed as ultimately unavoidable impurity by the sealing glass. Unavoidable impurities are in the case of alkali metal oxides usually in the range of not more than 500 ppm per alkali metal oxide, based on the weight.

It has surprisingly been found that $K_2O$ in particular can be particularly advantageous as component of the sealing glass. From the results of leeching and purification tests, it has been observed that potassium ions are not uniformly leeched out, in contrast to sodium ions. Rather, accumulation of potassium ions in the region close to the surface occurs. It is deduced therefrom that this accumulation of potassium ions represents a type of diffusion barrier for further leeching. This could, in the case of sealing glasses of embodiments of the present disclosure, lead to the mobility of the intrinsically mobile ions of alkali metals and/or alkaline earth metals being at least restricted, which could lead to the observed surprisingly good stability of the sealing glasses of embodiments of the present disclosure. This potassium enrichment could also be an explanation for the surprisingly low aggressiveness of the sealing glass of embodiments of the present disclosure in contact with ceramics.

The fact that the stability of the sealing glass has, in embodiments of the present disclosure, the abovementioned advantageous properties despite the content of potassium oxide and lithium oxide in the sealing glass is all the more surprising because silicate glasses comprising lithium oxide and/or potassium oxide, in particular borosilicate glasses comprising lithium oxide and/or potassium oxide, tend to undergo severe demixing, sometimes even demixing in which a penetration structure is formed (which is sometimes also referred to as spinodal decomposition). Such penetration structures can be particularly unfavorable when demixing into a readily soluble, for example highly boron- and alkali metal-rich, phase and a chemically resistant phase having a high $SiO_2$ content occurs. The very good resistances of the sealing glasses according to the present disclosure which are achieved in the present case are surprising because the formation of such a penetration structure obviously appears to have occurred. The sealing glass according to embodiments of the present disclosure is obviously stabilized against demixing to form a penetration structure (also frequently referred to as "spinodal decomposition").

Such stabilization in intrinsically demixing glass systems is frequently achieved by addition of $Al_2O_3$. However, in embodiments of the present disclosure, the sealing glass comprises only a small proportion of $Al_2O_3$ and is preferably free of $Al_2O_3$ except for unavoidable traces. The observed high chemical stability of the sealing glass of embodiments of the present disclosure is therefore also surprising in view of this background.

In addition, the production process for the sealing glass according to embodiments of the present disclosure has also been found to be unproblematical. In particular, there is no undesirable crystallization as is frequently observed in glass systems which demix. The sealing glasses according to embodiments of the present disclosure are also able to be thermally processed further after melting, in particular are pressable, without macroscopically visible clouding, for example, occurring in the sealing glass.

The inventors presume that a microscopic phase separation could possibly occur in the system observed here, for example as droplet demixing and/or in the form of clusters, i.e., random aggregations of individual glass components, which deviate from random distribution and in general have a small spatial extension of not more than a few microns in diameter, usually of less than one micron or even only a few hundred nanometers or less, and are therefore not discernible, or barely discernible, optically and/or chemically as demixing. Such clusters could, for example, be considered to be "sponge-like aggregations" as described by Hartleif and Dietzel. However, these clusters have hitherto not been detected in the sealing glasses according to embodiments of the present disclosure. Confirmation could also be difficult because the observed stability of the properties of the sealing glasses according to embodiments of the present disclosure makes it obvious that the properties of the clusters or the "droplets" differ only very little from the surrounding glass matrix, for example have a very similar chemical resistance.

A further component of the sealing glass is preferably CaO. According to an embodiment, the sealing glass comprises 0% by weight of CaO to preferably at most 15% by weight of CaO. As alkaline earth metal oxide, CaO is likewise a network transformer and is therefore likewise suitable for leading to a lowering of the softening point. In one embodiment, the content of CaO in the sealing glass is therefore at least 1% by weight, preferably at least 5% by weight, more preferably at least 5% by weight, particularly preferably 10% by weight, very particularly preferably at least 11% by weight and most preferably at least 12% by weight. It is known from ion exchange experiments that CaO as component significantly reduces the mobility of the alkali metal ions and can therefore be used for stabilizing the dielectric constant in the sealing glasses according to embodiments of the present disclosure. However, a content of CaO can also be disadvantageous since CaO can also lead to demixing and/or crystallization in a glass. In a further embodiment, it can therefore be advantageous for the content of CaO in the sealing glass to be not too high, for example be not more than 15% by weight, or only not more than 14% by weight or even only 13% by weight. Embodiments in which an even lower CaO content is possible, for example not more than 7% by weight or even only 1% by weight, are also possible. In particular, it is also possible, in one embodiment, for the sealing glass to be free of CaO except for unavoidable traces. Unavoidable traces here are contents of CaO in the sealing glass of not more than 500 ppm by weight. Preferred ranges for the content of CaO in the sealing glass can be from 0% by weight of CaO to not more than 15% by weight of CaO, preferably not more than 7% by weight of CaO, more preferably not more than 13% by weight of CaO, to not more than 1% by weight of CaO, or from at least 1% by weight of CaO to not more than 15% by weight of CaO, for example from at least 5% by weight to not more than 15% by weight, preferably from at least 10% by weight of CaO to not more than 15% by weight of CaO, particularly preferably from at least 11% by weight of CaO to not more than 14% by weight of CaO, very particularly preferably from at least 12% by weight of CaO to 13% by weight of CaO.

A further optional component of the sealing glass is BaO. As alkaline earth metal oxide, BaO is also a network transformer and is thus suitable for advantageously contributing to a low softening point being able to be obtained. The sealing glass can therefore comprise up to 16% by weight of BaO in embodiments. However, the content of BaO in the sealing glass is preferably also limited since BaO can lead, in particular, to demixing and/or crystallization. In addition, BaO increases the density of the sealing glass, which leads to a greater weight and can therefore be disadvantageous for the particular application. The content of BaO in the glass is therefore preferably not more than 10% by weight, more preferably not more than 5% by weight, particularly preferably not more than 1% by weight. Very particular preference can be given to the sealing glass being free of BaO except for unavoidable traces. Unavoidable traces here are a content of BaO of not more than 500 ppm.

ZnO is another further optional component of the sealing glass. According to an embodiment, the sealing glass comprises 0% by weight of ZnO to preferably at most 8% by weight of ZnO. ZnO is a transition group element and like an alkaline earth metal oxide acts here as network transformer in the glass network and thus contributes advantageously in the present case to a low softening point being able to be obtained. In one embodiment, the content of ZnO in the sealing glass is preferably at least 2% by weight. However, the content of ZnO in the sealing glass should not be too high and is, in one embodiment, not more than 8% by weight, preferably not more than 5% by weight, particularly preferably not more than 4.5% by weight and very particularly preferably not more than 4% by weight, with embodiments having even lower contents, for example not more than 1% by weight, also being possible. The low and preferably limited content in the sealing glass according to embodiments of the present disclosure is particularly advantageous since zinc silicate glasses can also tend to demix. In a further embodiment, the sealing glass is free of ZnO except for unavoidable traces. Unavoidable traces of ZnO are contents of not more than 500 ppm. Preferred ranges for the ZnO content can be from at least 2% by weight to not more than 4.5% by weight, preferably from at least 2% by weight to not more than 4% by weight.

A further optional component of the sealing glass is fluorine, F, in particular as fluoride ion or in the form of the fluoride ion, F. When the content of fluorine in the sealing glass is discussed in the present disclosure, this also encompasses a content of fluoride F$^-$ in the sealing glass. Fluorine is a component which acts as flux in glasses and therefore lowers the softening point. In one embodiment, the sealing glass preferably comprises at least 0.1% by weight of fluorine, preferably at least 0.5% by weight of fluorine. In one embodiment, the sealing glass even comprises at least 5% by weight of fluorine. However, an excessively high content of F leads to increased corrosion of the melting tank, so that the content of fluorine in the sealing glass is preferably limited. The sealing glass comprises not more than 10% by weight of fluorine, preferably not more than 8% by weight. It is also possible to conceive of embodiments in which the content of fluorine in the sealing glass is limited even further, for example the sealing glass comprises not more than 2% by weight of fluorine or even not more than 1.5% by weight. Preferred ranges for the fluorine content can be from at least 0.5% by weight to not more than 8% by weight, or from at least 0.1% by weight to not more than 2% by weight, or from at least 0.5% by weight to not more than 1.5% by weight, or from at least 5% by weight to not more than 8% by weight.

It has also been found that it is advantageous to use not more than two of the mobile components, i.e., of the alkaline earth metal oxides and alkali metal oxides, in the sealing glasses according to embodiments of the present disclosure. For this reason, the content of alkaline earth metal oxides or of oxides which act similarly to an alkaline earth metal oxide in the glass network is, in embodiments according to the present disclosure, preferably limited both in terms of the type and alternatively or additionally in terms of the amount. For the purposes of the present disclosure, an oxide which acts like an alkaline earth metal oxide in the glass network is in particular ZnO, in general an oxide of the type RO. In embodiments of the present disclosure, the sealing glass preferably comprises only two alkaline earth metal oxides or oxides which act as alkaline earth metal oxide, particularly preferably calcium oxide and zinc oxide, as components. Furthermore, the sum of the contents of alkaline earth metal oxides or oxides which act as alkaline earth metal oxides in the sealing glass is, in one embodiment, preferably at least 4% by weight and not more than 17% by weight, with the sum of the contents of CaO and ZnO in the sealing glass particularly preferably being, in one embodiment, at least 4% by weight and not more than 17% by weight.

The sealing glasses according to embodiments of the present disclosure are particularly suitable for being able to press an initially produced ingot at least once more and then being able to employ the pressed bodies in, for example, a reflow process to give crack-free seals around, for example, wires.

In a further embodiment, the sealing glass has a glass transition temperature $T_g$ in the range from 400° C. to 550° C., preferably from 450° C. to 500° C.

In one embodiment, the sealing glass comprises the following components in % by weight on an oxide basis:
$SiO_2$ from 45 to 75, preferably from 50 to 65, particularly preferably from 51 to 62,
$Al_2O_3$ from 0 to 2, preferably free of $Al_2O_3$ except for unavoidable traces,
$B_2O_3$ from 2 to 20, preferably from 5 to 18, particularly preferably from 8 to 17,
$Li_2O$ from 0 to 10, preferably from 0 to 5,
$Na_2O$ from 0 to 10, preferably free of $Na_2O$ except for unavoidable traces,
$K_2O$ from 5 to 40, preferably from 8 to 34, particularly preferably from 14 to 34,
CaO from 0 to 15, preferably from 0 to 13,
BaO from 0 to 16, preferably from 0 to 10, particularly preferably free of BaO except for unavoidable traces,
ZnO from 0 to 8, preferably from 0 to 5,
F from 0 to 10, preferably from 0.5 to 8,
where the sum of the alkali metal oxides, $\Sigma R_2O$, is in the range from at least 10% by weight to not more than 40% by weight, preferably from at least 15% by weight to not more than 35% by weight, where the sealing glass is free of $Na_2O$ and PbO except for unavoidable traces, where unavoidable traces of $Na_2O$ and PbO are in each case not more than 500 ppm by weight, where the sealing glass can additionally comprise secondary constituents and/or traces, for example in the form of refining agents, where the sum of the secondary constituents and/or traces is preferably less than 2% by weight in total.

The glass of the invention can therefore comprise customary refining agents in small amounts. The sum of the refining agents added is preferably not more than 1.0% by weight, more preferably not more than 0.5% by weight. As refining agent, at least one of the following components (in % by weight) can be present in the glass of the invention:

| | | |
|---|---|---|
| $Sb_2O_3$ | 0-1 | and/or |
| $As_2O_3$ | 0-1 | and/or |
| SnO | 0-1 | and/or |
| Halide (Cl, F) | 0-1 | and/or |
| $SO_4^{2-}$ | 0-1 | and/or |
| Inorganic peroxides | 0-1 | . |

As inorganic peroxides, it is possible to use, for example, zinc peroxide, lithium peroxide and/or alkaline earth metal peroxides.

In an advantageous embodiment, the glass of the invention is refined using $As_2O_3$.

In a further advantageous embodiment of the present invention, the glass is free of $As_2O_3$ since this component is considered to be problematical for ecological reasons.

It has been found that a particularly advantageous composition range of sealing glasses is obtained in this way.

In particular, the sealing glass having such a composition comprises, apart from $Li_2O$, relatively inexpensive raw materials for which good supply security is also ensured.

Such a composition is also advantageous in respect of the stability of the dielectric properties. This is because the total content of "mobile" ions in the sealing glass, preferably both in terms of the type and in terms of the amount, ultimately has to be reduced in order to ensure a sufficient temperature-time stability of the glass properties, in particular the dielectric properties, for example also the dielectric constant. However, these mobile ions, which are in particular the ions of the network transformers, also have to be present in a sufficient amount in order to achieve a very low fusion temperature. A high content of network transformers in a glass, e.g., a sealing glass, usually leads at the same time to a low $T_g$ and a high coefficient of linear thermal expansion. In the present case, however, the glass transition temperature $T_g$ should preferably be as low as possible, particularly advantageously 500° C. or less, but at the same time the coefficient of thermal expansion is restricted and is preferably less than $14*10^{-6}$/K, particularly preferably less than $13*10^{-6}$/K and particularly preferably less than $11*10^{-6}$/K, for example $10.5*10^{-6}$/K or even less. For this reason, a certain content of mobile ions is required in the present case, but they must not present in too large an amount and also not be the wrong ones. It has been found that a good compromise is achieved in the case of a composition of the sealing glass as indicated above. In particular, it is in this way possible to obtain a low glass transition temperature combined with a not-too-great coefficient of linear thermal expansion and good stability of the glass properties, in particular the dielectric properties of the sealing glass.

DETAILED DESCRIPTION

Figure 1A:
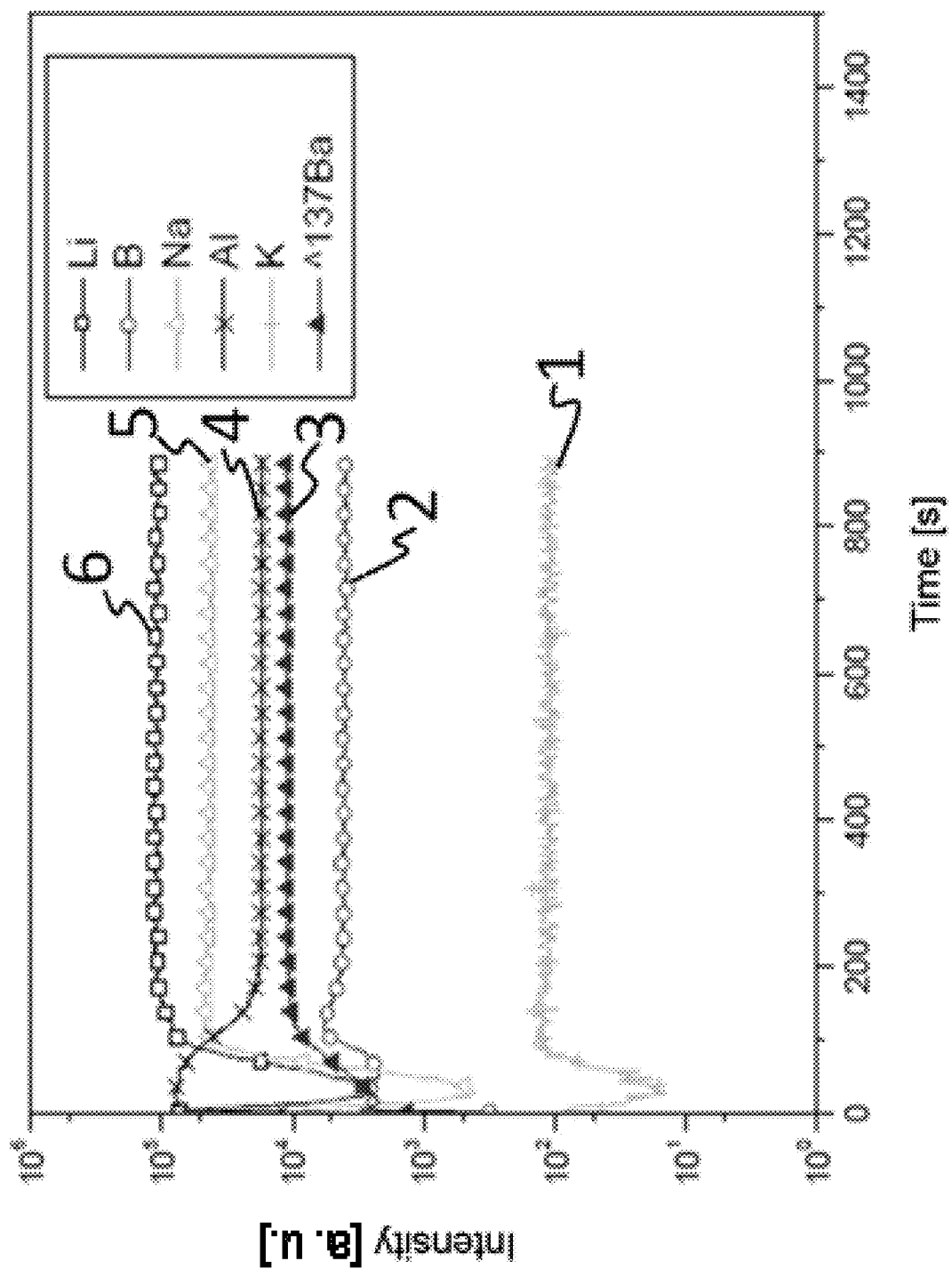
FIGS. 1a-1b show ToF-SIMS graphs of a potassium-containing glass to illustrate the formation of potassium enrichment.

The invention will be explained further below with the aid of examples. If contents do not add up to 100% by weight in the examples, this is attributable to usual measurement inaccuracies and/or the presence of possible traces and/or rounding errors.

An advantageous composition of a sealing glass according to the present disclosure is given by the following composition range on an oxide basis in % by weight:
$SiO_2$ from 45 to 75, preferably from 50 to 65, particularly preferably from 51 to 62,
$Al_2O_3$ from 0 to 2, preferably free of $Al_2O_3$ except for unavoidable traces,
$B_2O_3$ from 2 to 20, preferably from 5 to 18, particularly preferably from 8 to 17,
$Li_2O$ from 0 to 10, preferably from 0 to 5,
$Na_2O$ from 0 to 10, preferably free of $Na_2O$ except for unavoidable traces,
$K_2O$ from 5 to 40, preferably from 8 to 34, particularly preferably from 14 to 34,
CaO from 0 to 15, preferably from 0 to 13, BaO from 0 to 16, preferably from 0 to 10, particularly preferably free of BaO except for unavoidable traces,
ZnO from 0 to 8, preferably from 0 to 5,
F from 0 to 10, preferably from 0.5 to 8,
where the sum of the alkali metal oxides, $\Sigma R_2O$, is in the range from at least 10% by weight to not more than 40% by weight, preferably from at least 15% by weight to not more than 35% by weight.

A further advantageous composition of a sealing glass according to the present disclosure is given by the following composition range on an oxide basis in % by weight:
SiO$_2$ from 50 to 63, preferably from 51 to 56,
Al$_2$O$_3$ from 0 to 2, preferably free of Al$_2$O$_3$ except for unavoidable traces,
B$_2$O$_3$ from 5 to 18, preferably from 7 to 11,
Li$_2$O from 1 to 10, preferably from 3 to 5,
Na$_2$O from 0 to 10, preferably from 0 to 0.5, particularly preferably free of Na$_2$O except for unavoidable traces,
K$_2$O from 12 to 20, preferably from 15 to 18,
CaO from 1 to 15, preferably from 5 to 15, more preferably from 10 to 15, particularly preferably from 11 to 14, very particularly preferably from 12 to 13,
BaO from 0 to 5, preferably from 0 to 1,
ZnO from 0 to 5, preferably from 2 to 4.5, particularly preferably from 2 to 4,
F from 0 to 5, preferably from 0.1 to 2, particularly preferably from 0.5 to 1.5,
where the sum of the alkali metal oxides, $\Sigma R_2O$, is in the range from at least 13% by weight to not more than 30% by weight, preferably from at least 14% by weight to not more than 26% by weight, particularly preferably from at least 16% by weight to not more than 24% by weight.

Sealing glasses which have compositions within the above composition range make it possible to achieve dielectric constants $\varepsilon_r$ in the range from at least 7.40 to not more than 7.80, preferably determined at a measurement frequency of 1 MHz and a temperature of 25° C.

The glass transition temperature, $T_g$, of the sealing glasses having compositions within the above composition range is preferably in the range from 400° C. to 550° C., preferably from 450° C. to 500° C.

Example 1

In one embodiment, the sealing glass comprises the following components in % by weight on an oxide basis:

| | |
|---|---|
| SiO$_2$ | 55.6 |
| Al$_2$O$_3$ | 0.030 |
| B$_2$O$_3$ | 8.4 |
| Li$_2$O | 4.1 |
| K$_2$O | 15.9 |
| CaO | 11.9 |
| ZnO | 3.4 |
| F | 0.54. |

In the case of the composition of the sealing glass as per example 1, the following properties are achieved:
Density 2.59 g/cm$^3$
$\alpha_{20-300}$ 10.22*10$^{-6}$/K
Softening point 601° C.
Working point 792° C.
Dielectric constant $\varepsilon_r$ 7.5
$T_g$ 470° C.

The softening point is, for the purposes of the present disclosure, the temperature at which a glass, here the sealing glass according to embodiments, has a viscosity of 10$^{7.6}$ dPas, and the working point is the temperature at which a glass, here the sealing glass according to embodiments, has a viscosity of 10$^{-4}$ dPas.

Example 2

In a further embodiment, the sealing glass comprises the following components in % by weight on an oxide basis:

| | |
|---|---|
| SiO$_2$ | 54.1 |
| Al$_2$O$_3$ | 0.023 |
| B$_2$O$_3$ | 9.0 |
| Li$_2$O | 4.1 |
| K$_2$O | 16.6 |
| CaO | 11.9 |
| ZnO | 3.4 |
| F | 0.63. |

In the case of the composition of the sealing glass as per example 2, the following properties are achieved:
Density 2.59 g/cm$^3$
$\alpha_{20-300}$ 10.4*10$^{-6}$/K
Softening point 593° C.
Working point 777° C.
Dielectric constant $\varepsilon_r$ 7.5
$T_g$ 475° C.

Example 3

In another embodiment, the sealing glass comprises the following components in % by weight on an oxide basis:

| | |
|---|---|
| SiO$_2$ | 53.1 |
| Al$_2$O$_3$ | 0.021 |
| B$_2$O$_3$ | 9.3 |
| Li$_2$O | 4.2 |
| K$_2$O | 17.2 |
| CaO | 12.0 |
| ZnO | 3.5 |
| F | 0.68. |

In the case of the composition of the sealing glass as per example 3, the following properties are achieved:
Density 2.59 g/cm$^3$
$\alpha_{20-300}$ 10.57*10$^{-6}$/K
Softening point 588° C.
Working point 764° C.
Dielectric constant $\varepsilon_r$ 7.5
$T_g$ 470° C.

The sealing glass of examples 1 to 3 is in each case preferably free of Na$_2$O and PbO except for unavoidable traces, where unavoidable traces of Na$_2$O and PbO are in each case not more than 500 ppm by weight, where the sealing glass can additionally comprise secondary constituents and/or traces, for example in the form of refining agents, where the sum of the secondary constituents and/or traces is preferably less than 2% by weight in total.

Still another advantageous composition of a sealing glass according to the present disclosure is given by the following composition range on an oxide basis in % by weight:
SiO$_2$ from 50 to 72, preferably from 58 to 63,
Al$_2$O$_3$ from 0 to 2, preferably free of Al$_2$O$_3$ except for unavoidable traces,
B$_2$O$_3$ from 2 to 20, preferably from 13 to 18,
Li$_2$O from 0 to 5, preferably from 0 to 1, particularly preferably free of Li$_2$O except for unavoidable traces, Na$_2$O from 0 to 10, preferably from 0 to 5, particularly preferably free of Na$_2$O except for unavoidable traces, K$_2$O from 10 to 35, preferably from 15 to 35, particularly preferably from 15 to 20, CaO from 0 to 7, preferably from 0 to 1, particularly preferably free of CaO except for unavoidable traces, BaO from 0 to 16, more preferably from 0 to 5, particularly preferably from 0 to 1, particularly preferably free of BaO except for unavoidable traces, ZnO from 0 to 5, preferably from 0 to 1, particularly preferably free of ZnO except for unavoidable traces, F from 0 to 8, preferably from 5 to 8, where the sum of the alkali metal oxides, $\Sigma R_2O$, is in the range from at least 15% by weight to not more than 35% by weight, preferably from at least 17% by weight to not more than 34% by weight.

In the case of sealing glasses which have compositions within the above composition range, it is possible to achieve dielectric constants $\varepsilon_r$, in the range from at least 7.10 to not more than 7.80, preferably determined at a measurement frequency of 1 MHz and a temperature of 25° C.

The glass transition temperature, $T_g$, of the sealing glasses having compositions within the above composition range is preferably in the range from 400° C. to 550° C.

Example 4

In a further embodiment, the sealing glass comprises the following components in % by weight on an oxide basis:

| | |
|---|---|
| SiO$_2$ | 54.3 |
| Al$_2$O$_3$ | 0.016 |
| B$_2$O$_3$ | 14.6 |
| K$_2$O | 30.0 |
| F | 0.75. |

In the case of the composition of the sealing glass as per example 2, the following properties are achieved:

Density 2.49 g/cm$^3$ $\alpha_{20\text{-}300}$ 11.3*10$^{-6}$/K

Dielectric constant $\varepsilon_r$ 7.2

$T_g$ 531° C.

Figure 1B:
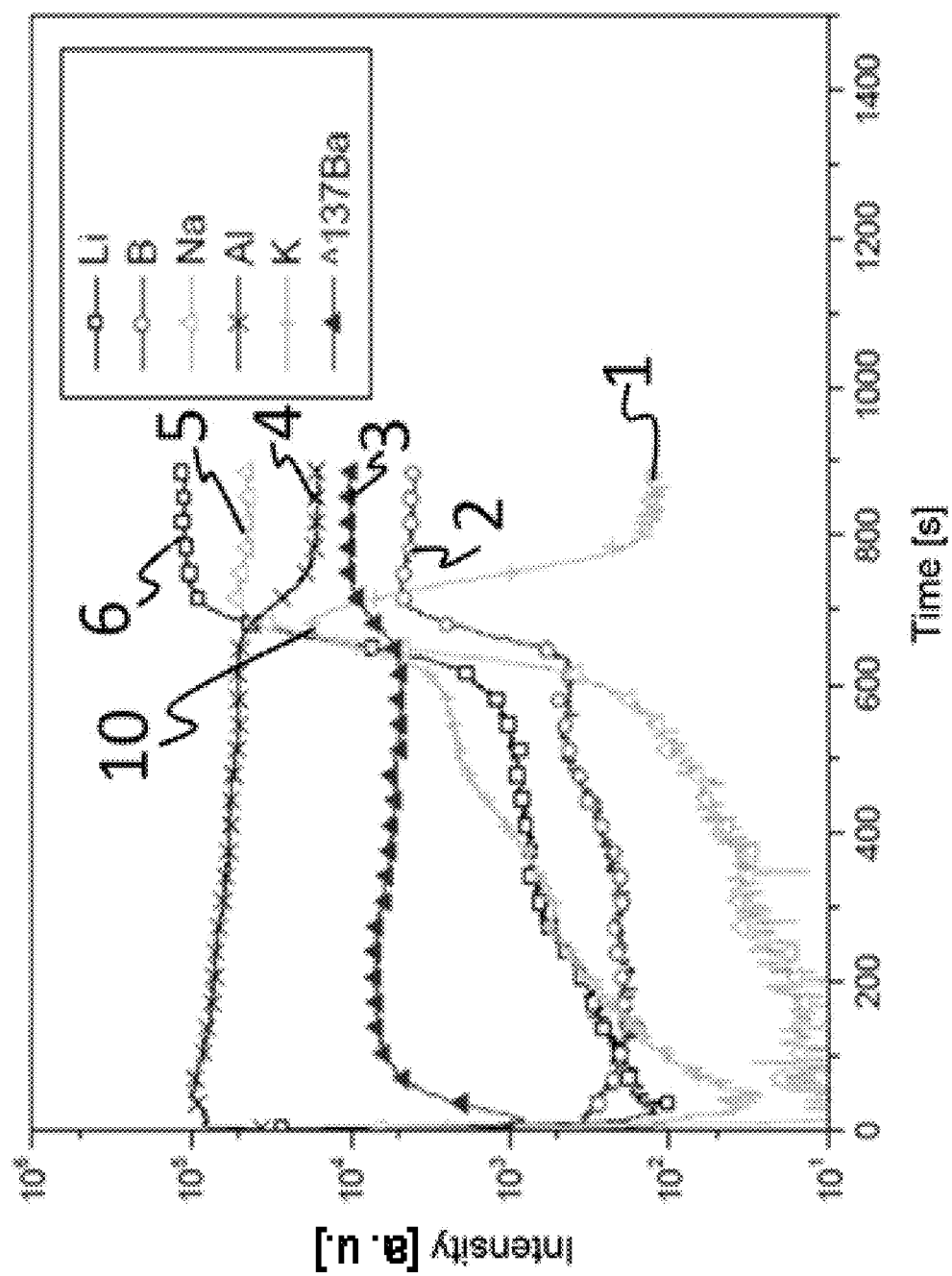

FIGS. 1a and 1b shows concentration curves determined by means of ToF-SIMS of particular ions in a potassium-containing glass to illustrate the potassium enrichment in surface layers of glass.

FIG. 1a, a first ToF-SIMS graph for a potassium-containing glass in the ground and polished state is shown. The intensity of the measurement signal in arbitrary units a. u. is plotted on the Y axis, while the sputtering time in seconds is plotted on the x axis, with a higher sputtering time indicating a greater penetration depth into the surface of the test specimen examined, here a potassium-containing glass.

The concentration curves 1, 2, 3, 4, 5 and 6 of the ions potassium K$^+$, boron$^{3+}$, Ba$^{2+}$ (for $^{137}$Ba$^{2+}$), Al$^{3+}$, Na$^+$ and Li$^+$ at the surface of a glass are shown here and designated accordingly.

In comparison, FIG. 1b shows the respective concentration curve after cleaning.

Although the surface of the specimen for FIG. 1a is polished and thus at least mildly cleaned, for the test specimen in FIG. 1b appropriate surface cleaning, for example as is carried out in the production of optical elements such as lenses, was undertaken. The surface of the test specimen on which the ToF-SIMS graph of FIG. 1b was based was thus exposed over a longer period of time to moisture in the form of an aqueous cleaning solution.

It can be seen that in the case of the glass under consideration in FIGS. 1a-1b after such a cleaning process there is enrichment 10 of potassium in a layer close to the surface, here corresponding to a sputtering time of about 700 seconds.

The inventors presume that the ability of potassium to form such an enriched layer on contacting of the surface of the glass could lead to the surprising positive effect of the stability of the glass properties, in particular the dielectric properties, even in the case of temperature stresses, in the case of the sealing glasses according to embodiments of the present disclosure. The formation of such a potassium-enriched layer could hinder the mobility of other ions and/or stabilize the polarizability of the glass network.

LIST OF REFERENCE NUMERALS

1 Potassium concentration curve
11 Potassium enrichment
2 Boron concentration curve
3 $^{137}$Barium concentration curve
4 Aluminum concentration curve
5 Sodium concentration curve
6 Lithium concentration curve

What is claimed is:

1. A sealing glass comprising:
SiO$_2$ having a content of at least 45% by weight;
Al$_2$O$_3$ having a content of less than 2% by weight;
Na$_2$O having a content of not more than 5% by weight;
free of PbO except for unavoidable impurities;
Li$_2$O in a content of greater than 0% by weight;
K$_2$O in a content of at least 5% by weight;
a coefficient of linear thermal expansion ($\alpha_{20\text{-}300}$) of more than 10*10$^{-6}$/K;
a dielectric constant ($\varepsilon_r$) in the range from at least 7.10 to not more than 7.80 at a measurement frequency of 1 MHz and a temperature of 25° C.; and
a glass transition temperature ($T_g$) in a range from 400 to 550° C.

2. The sealing glass of claim 1, wherein the glass transition temperature ($T_g$) is in a range of 450° C. to 500° C.

3. The sealing glass of claim 1, wherein the SiO$_2$ has a content of at least 45% by weight and not more than 75% by weight.

4. A sealing glass comprising:
SiO$_2$ having a content of at least 45% by weight;
Al$_2$O$_3$ having a content of less than 2% by weight;
Na$_2$O having a content of not more than 5% by weight;
free of PbO except for unavoidable impurities;
a coefficient of linear thermal expansion ($\alpha_{20\text{-}300}$) of more than 10*10$^{-6}$/K;
a dielectric constant ($\varepsilon_r$) in the range from at least 7.10 to not more than 7.80 at a measurement frequency of 1 MHz and a temperature of 25° C.;
a glass transition temperature ($T_g$) in a range from 400 to 550° C.; and
a content of B$_2$O$_3$ of at least 2% by weight and not more than 20% by weight.

5. The sealing glass of claim 1, further comprising alkali metal oxides having a total content that is at least 10% by weight and not more than 40% by weight and Na$_2$O having a content that is not more than 500 ppm.

6. The sealing glass of claim 1, wherein the Li$_2$O has a content of 0% to not more than 10% by weight.

7. The sealing glass of claim 1, wherein the $K_2O$ has a content of at least 5% by weight of and not more than 40% by weight.

8. The sealing glass of claim 1, comprising two different alkaline earth metal oxides.

9. The sealing glass of claim 1, comprising two different oxides that act as glass network transformers.

10. The sealing glass of claim 9, wherein the two different oxides are CaO and ZnO.

11. A sealing glass comprising:
    $SiO_2$ having a content of at least 45% by weight;
    $Al_2O_3$ having a content of less than 2% by weight;
    $Na_2O$ having a content of not more than 5% by weight;
    free of PbO except for unavoidable impurities;
    a coefficient of linear thermal expansion ($\alpha_{20-300}$) of more than $10*10^{-6}/K$;
    a dielectric constant ($\varepsilon_r$) in the range from at least 7.10 to not more than 7.80 at a measurement frequency of 1 MHz and a temperature of 25° C.;
    a glass transition temperature ($T_g$) in a range from 400 to 550° C.;
    CaO having a content of greater than 0% by weight to not more than 15% by weight; and
    ZnO having a content of greater than 0% by weight to not more than 8% by weight.

12. The sealing glass of claim 1, further comprising ZnO having a content of 0% by weight to not more than 8% by weight.

13. The sealing glass of claim 1, further comprising a stability of the dielectric constant, determined by a ratio of $$\frac{C}{C_0}$$

where $C_0$ is a capacitance in an initial state and C is the capacitance after a thermal stressing,
where the ratio is less than 2 determined for the thermal stressing at 85° C.

14. The sealing glass of claim 13, wherein the thermal stressing takes place between 40 hours and 600 hours.

15. The sealing glass of claim 13, wherein the ratio is less than less than 1.2.

16. The sealing glass of claim 1, comprising in % by weight on an oxide basis:
    $SiO_2$ from 45 to 75,
    $B_2O_3$ from 2 to 20,
    $Li_2O$ from greater than 0 to 10,
    $K_2O$ from 5 to 40,
    CaO from 0 to 15,
    BaO from 0 to 16,
    ZnO from 0 to 8,
    F from 0 to 10,
    a sum of alkali metal oxides in a range from at least 10% by weight to not more than 40% by weight, and
    not more than 500 ppm by weight of $Na_2O$ and PbO.

17. The sealing glass of claim 1, comprising, in % by weight on an oxide basis:
    $SiO_2$ from 50 to 63,
    $B_2O_3$ from 5 to 18,
    $Li_2O$ from 1 to 10,
    $K_2O$ from 12 to 20,
    CaO from 1 to 15,
    BaO from 0 to 5,
    ZnO from 0 to 5,
    F from 0 to 5,
    a sum of alkali metal oxides in a range from at least 13% by weight to not more than 30% by weight, and
    not more than 500 ppm by weight of $Na_2O$ and PbO.

18. The sealing glass of claim 1, comprising in % by weight on an oxide basis:
    $SiO_2$ from 50 to 72,
    $Al_2O_3$ from 0 to 2,
    $B_2O_3$ from 2 to 20,
    $Li_2O$ from greater than 0 to 5,
    $K_2O$ from 10 to 35,
    CaO from 0 to 7,
    BaO from 0 to 16,
    ZnO from 0 to 5,
    F from 0 to 8,
    a sum of alkali metal oxides in a range from at least 15% by weight to not more than 35% by weight, and
    not more than 500 ppm by weight of $Na_2O$ and PbO.

19. A sealing glass comprising:
    $SiO_2$ having a content of at least 45% by weight;
    $Al_2O_3$ having a content of less than 2% by weight;
    $Na_2O$ having a content of not more than 5% by weight;
    glass network transformers comprising CaO and ZnO;
    free of PbO except for unavoidable impurities;
    a coefficient of linear thermal expansion ($\alpha_{20-300}$) of more than $10*10^{-6}/K$; and
    a dielectric constant ($\varepsilon_r$) in the range from at least 7.10 to not more than 7.80 at a measurement frequency of 1 MHz and a temperature of 25° C.

\* \* \* \* \*